United States Patent [19]

Nishioka et al.

[11] Patent Number: 4,805,028
[45] Date of Patent: Feb. 14, 1989

[54] TELEVISION CAMERA FOR ENDOSCOPES PROVIDED WITH AN OPTICAL LOW-PASS FILTER

[75] Inventors: Kimihiko Nishioka, Hachiouji; Jun Yoshinaga, Hino, both of Japan

[73] Assignee: Olympus Optical Co., Ltd., Tokyo, Japan

[21] Appl. No.: 111,073

[22] Filed: Oct. 19, 1987

Related U.S. Application Data

[63] Continuation of Ser. No. 819,611, Jan. 17, 1986, abandoned.

[30] Foreign Application Priority Data

Jan. 18, 1985 [JP] Japan ............................ 60-4243[U]

[51] Int. Cl.4 ......................... H04N 5/30; H04N 5/225
[52] U.S. Cl. ........................................ 358/225; 358/55
[58] Field of Search .................... 358/225, 209, 55; 250/578; 350/162.12, 162.24; 354/62, 295–296

[56] References Cited

U.S. PATENT DOCUMENTS

| | | | |
|---|---|---|---|
| 3,588,224 | 6/1971 | Pritchard | 350/157 |
| 4,178,611 | 12/1979 | Okano | 358/55 |
| 4,245,909 | 1/1981 | Loos | 350/162.12 |
| 4,439,030 | 3/1984 | Ueda | 358/98 |
| 4,554,585 | 11/1985 | Carlson | 358/225 |
| 4,611,243 | 9/1986 | Morisawa et al. | 358/225 |

FOREIGN PATENT DOCUMENTS

0176334  4/1986  European Pat. Off. ............ 358/225

Primary Examiner—Jin F. Ng
Assistant Examiner—Stephen Brinich
Attorney, Agent, or Firm—Cushman, Darby & Cushman

[57] ABSTRACT

In order to effectively eliminate moiré without requiring the preparation, on hand, of various types of adapters and to make it possible to obtain an image of high resolution, a television camera is arranged that a plurality of optical low-pass filters having mutually different optical characteristics are housed within the camera body so as to place either one of these optical low-pass filters into the photographic optical path by external manual operation, or arranged that a plurality of optical low-pass filters having mutually different optical characteristics disposed on the photographic optical path are housed within the camera body so as to rotate at least one of these optical low-pass filters about the optical axis by external manual operation.

26 Claims, 8 Drawing Sheets

HORIZONTAL DIRECTION OF IMAGE PICKUP DEVICE

FIG. 25

TELEVISION CAMERA FOR ENDOSCOPES PROVIDED WITH AN OPTICAL LOW-PASS FILTER

This is a continuation of application Ser. No. 819,611, filed Jan. 17, 1986, which was abandoned upon the filing hereof.

BACKGROUND OF THE INVENTION (a) Field of the Invention:

The present invention relates to a television camera, and more particularly it relates to an improvement of the television camera which can be used suitably with an endoscope or like devices.

(b) Description of the Prior Art:

For example, endoscopes include a non-flexible endoscope which uses a relay lens system serving as the optical system intended to lead, to an ocular unit or eyepiece, the image formed by the objective lens, and a fiberscope using an image guide fiber bundle. Arrangement is provided so that, in case an image obtained by such an endoscope as mentioned above is to be observed through a TV monitor, an image pickup is performed by a television camera which is attached to the eyepiece of the endoscope. In such a case, however, there have to be prepared on hand various types of adapters for selective use with non-flexible endoscopes and fiberscopes, or for respective types of fiberscopes for replacement to be suitable for respective fiberscopes, which have been quite troublesome to operate. Also, in television cameras in general, the arrangement of picture elements of an image pickup device, scanning lines, color separation stripe filter, etc. form regular lattices, so that in case an object to be photographed contains regular lattice portions, there develops moiré on the TV monitor screen due to interference, so that arrangement has been provided usually to provide an optical low-pass filter between the photographic lens and the image-forming surface to thereby prevent the development of moiré. It should be noted here, however, that this low-pass filter is selected so as to be effective for general photography by the television camera, i.e. for photography of landscapes, persons and the like, so that in case a photography is performed by attaching a TV camera to a fiberscope having a structure that the core portion of the image guide fiber bundle is of a regular arrangment, there has been the inconvenience that, because the exit end face of the image guide fiber bundle has a regularity, it has not been possible to sufficiently prevent the occurrence of moiré phenomenon.

For the reasons mentioned above, it has been the practice in the past to use an adapter which has, incorporated therein, only a photographic lens for such an apparatus as a non-flexible endoscope, and also to use, in case of a fiberscope, an adapter in which are incorporated a photographic lens and a low-pass filter intended to eliminate moiré. Besides, in view of the fact that different moirés apt to develop depending on the size of the respective constituent fibers of the image guide fiber bundle or on the type of the ocular, there has to be prepared, on hand, adapters in which are incorporated different low-pass filters, respectively, for each type of fiberscopes. Thus, there has been the problem that the prior art devices are very poor and troublesome inoperability.

Also, if it is made possible to switch one filter to another to meet various circumstances of use not only in endoscopes but also in television cameras and in electronic still-cameras in general, it is possible to photograph an object always with a highest degree of resolution, and thus this would be convenient.

SUMMARY OF THE INVENTION

It is, therefore, the primary object of the present invention to provide a television camera which is of the arrangement to effectively eliminate moiré without requiring the preparation, for handy use, of a number of different kinds of adapters.

According to the present invention, this object is attained by the arrangement that a plurality of optical low-pass filters having mutually different optical characteristics, for example, spatial frequency responses, are provided within a camera body so that either one of them is selectively placed in the photographic optical path by manual operation externally of the camera body, or by the arrangement that a plurality of optical low-pass filters having mutually different optical characteristics are arranged on the photographic optical path within the body of camera so that at least one of these optical low-pass filters is rotated around the optical axis by external manual operation.

Another object of the present invention is to construct the television camera of this type in a compact size as much as possible.

Still another object of the present invention is to provide a television camera which provides an image of a high resolving power without intensifying moiré elimination effect more than necessary.

Yet another object of the present invention is to provide a television camera which can be suitably used for various types of endoscopes.

These and other objects of the present invention will become more apparent during the course of the following detailed description and appended claims.

DETAILED DESCRIPTION OF THE PREFERRED EMBODIMENTS

The present invention will hereunder be described in further detail based on the embodiments shown in the drawings.

Figure 1:
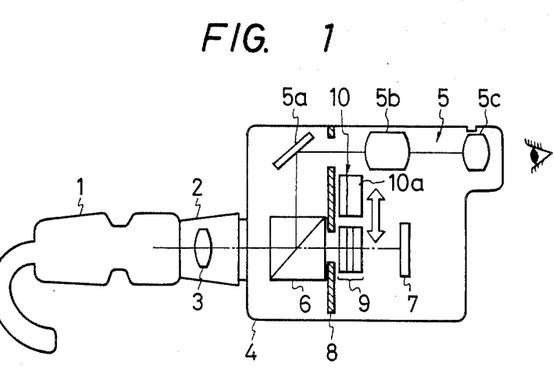
FIG. 1 is a diagrammatic illustration showing an example of the state of use of an embodiment of the television camera according to the present invention.
Figure 2A:
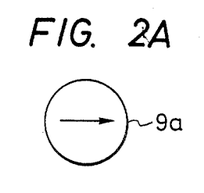
FIGS. 2A, 2B and 2C are diagrammatic illustrations showing the directions of double refraction of the three crystal plates constituting an optical low-pass filter.
Figure 2B:
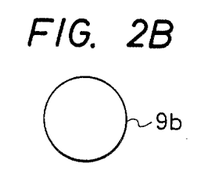
Figure 2C:
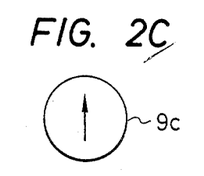
Figure 3:
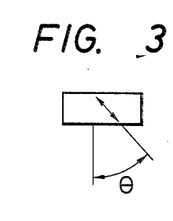
FIG. 3 is a diagrammatic illustration showing the orientation of the crystal axis of a crystal plate.
Figure 4:
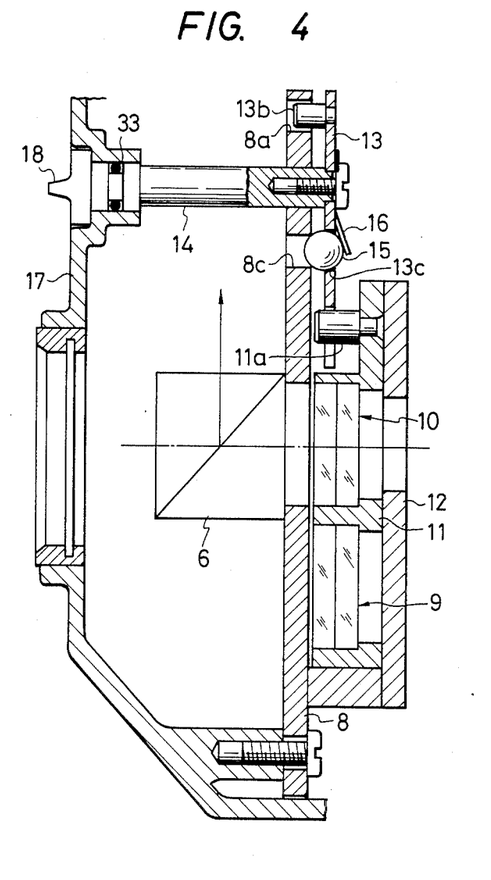
FIGS. 4 and 5 are a sectional view and a pespective view showing a concrete structural example of the low-pass filter changeover mechanism.
Figure 5:
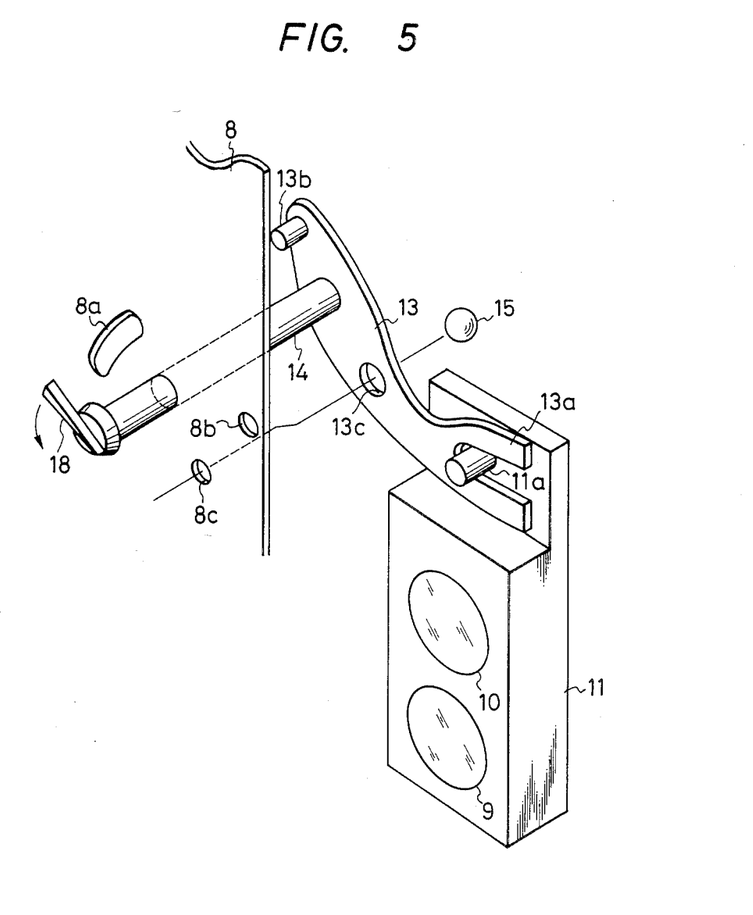

In FIG. 1, reference numeral 1 represents a flexible endoscope which is constructed in the form of, for example, fiberscope; 2 an adapter attached to the ocular unit of the endoscope 1, wherein a photogahpic lens 3 is incorporated; 4 a television camera body removably mounted rearwardly of the adapter 2, and this television camera body is provided therein with a beam splitter 6 having a half-mirror for splitting the path of light to a finder optical system 5 comprising a mirror 5a, a relay lens 5b and an ocular 5c, and to a photographing optical system, an image pickup device 7, an attachment plate 8 provided between said beam splitter 6 and said image pickup device 7, and optical low-pass filters 9 and 10 attached to said attachment plate 8 for being movable in the direction indicated by an arrow. It should be noted here that the low-pass filter 9 is comprised of three crystal or birefringent plates 9a, 9b and 9c arranged in this order starting with the beam splitter 6 side. The respective crystal plates are formed in such a way as shown in FIGS. 2A, 2B and 2C when viewed on the image pickup device 7 side, i.e. these crystal plates 9a and 9c perform splitting of a light bundle in the directions of arrows shown in FIGS. 2A and 2C due to double refraction, and have such a crystal axis orientation $\theta$ as shown in FIG. 3 about the normal of the surface of the crystal plate, wherein the amount of double refraction becomes maximum at $\theta \approx 45°$ when the crystal plates have a same thickness. That is, in order to obtain a same amount of double refraction, the crystal plates will have a smallest thickness when the orientation of crystal axis is $\theta \approx 45°$ and this is advantageous and useful in making the television camera compact in size. The crystal plate 9b is a ¼ wave plate. also, the optical low-pass filter 10 is made thinner than the optical low-pass filter 9, so that said low-pass filter 10 has a cemented glass plate (transparent plate) 10a for having a same optical path as that of the low-pass filter 9. FIGS. 4 and 5 show a concrete structural example of the low-pass filter changeover mechanism, in which reference numeral 11 represents an attachment frame for holding the low-pass filters 9 and 10, and this attachement frame is arranged to be movable to insure the respective low-pass filters 9 and 10 to be allowed to be selectively placed into the photographic optical path between the attachment plate 8 and a guide frame 12 having an L-shaped cross section and attached to said attachement plate 8, and also said attachment frame 11 has a pin 11a. Numeral 13 represents a lever secured to an axis 14 which, in turn, is rotatably supported on said attachement plate 8. This lever 13 has a bifurcated end portion 13a which loosely nips the pin 11a of the attachment frame 11, and also has a stopper pin 13b set on the other end portion of this lever for restricting the rotation of the lever 13 as said stopper pin 13b engages in a slot 8a formed through said attachment plate 8. Numeral 15 denotes a ball fit in a hole 13c formed through said lever 13 and urged toward the left side in FIG. 4 by a spring 16, and is arranged to act in such a way that, in the state that the stopper pin 13b is brought into contact with either one marginal end of the slot 8a of the attachment plate 8 allowing either the low-pass filter 9 or 10 to be placed in the photographic optical path, the ball 15 drops into a click hole 8b or 8c both of which are formed through the attachement plate 8 to thereby anchor the lever 13. Numeral 17 represents a side wall of the television camera body. An end of the axis 14 passes through this side wall 17 to protrude beyond thereof to the outside thereof, and it has an operating lever 18 for causing rotation of the lever 13. It should be noted here that a color separation prism not shown may be mounted on the guide frame 12.

The first embodiment of the present invention is constructed as described above. Therefore, let us here assume that, from the state in which the ball 15 engages in the click hole 8c as shown in FIG. 5, and in which the stopper pin 13b is in contact with a marginal end of the slot 8a of the attachment plate 8, and in which, accordingly, the optical low-pass filter 10 is placed in the photographic optical path, the operating lever 18 is rotated in the direction of the arrow shown in FIG. 5 to cause the stopper pin 13b of the lever 13 to be brought into contact with the other marginal end of the slot 8a of the attachment plate 8. Whereupon, the ball 15 engages in the click hole 8b, causing the optical low-pass filter 9 to be placed in the photographic optical path. When, from the above-mentioned state, the operating lever 18 is rotated in the reverse direction, the mechanism is returned to the illustrated state, i.e. it is set back to the state in which the low-pass filter 10 is placed in the photographic optical path. Thus, by rotating the operating lever 18, two kinds of low-pass filters 9 and 10 can be selected arbitrarily externally of the camera body in accordance with the type of the adapter 2 which is to be attached thereto.

Figures 6, 7:
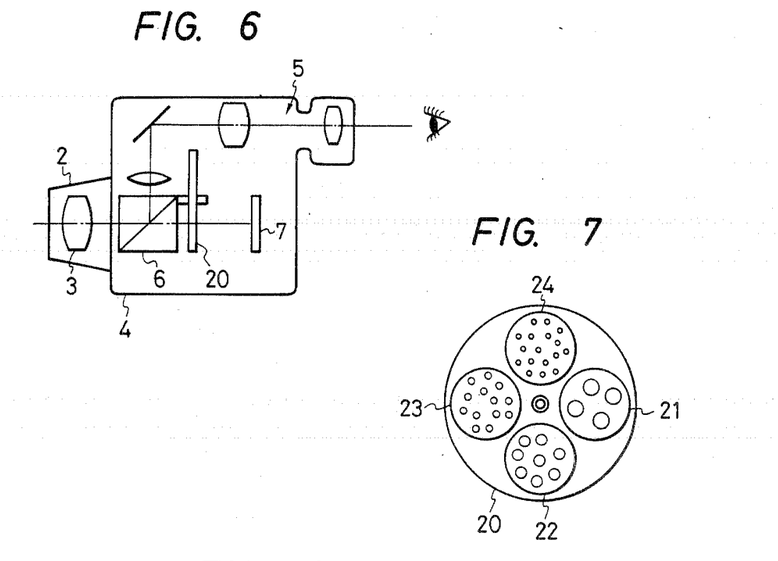
FIG. 6 is a diagrammatic general illustration showing a second embodiment of the television camera according to the present invention.
FIG. 7 is a diagrammatic front view of the turret plate of the embodiment shown in FIG. 6.
Figure 8:
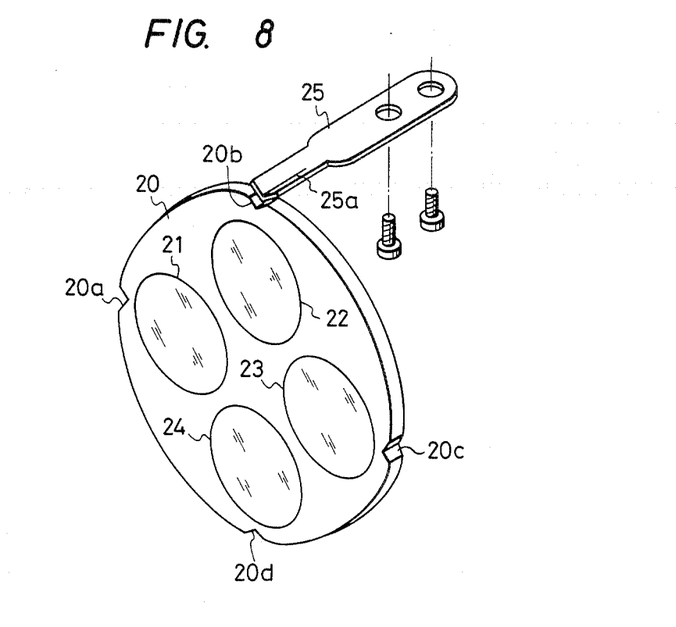
FIG. 8 is a diagrammatic perspective view showing a concrete example of the turret plate.

FIGS. 6 and 7 show a second embodiment of the present invention. Reference numeral 20 represents a turret plate provided with four phase type optical low-pass filters 21, 22, 23 and 24 having mutually different moiré eliminating effects, respectively. This turret plate is arranged so that, by rotation thereof, these respective low-pass filters 21, 22, 23 and 24 can be selectively placed in the photographic optical path. These respective low-pass filters are produced by irregularly providing, onto each of these glass plates (transparent plates), dots of film by vapor deposition for causing a phase difference of about $\pi$. The sum area of these dot portions of vapor-deposition films occupies about one half of the area of the glass plates. The larger the size of the dots is, the smaller becomes the moiré elimination effect, and the smaller the size of the dots is, the greater becomes the moiré elimination effect. By selecting the size of these dots so as to meet the non-flexible endoscope as well as a plurality of endoscopes in which the diameter of fibers cnstituting the image of the exit end face of the image guide to be formed on the image pickup device 7 by the photographing lens 3 is different, it is possible to obtain an image of a high resolution without requiring to intensifying the moiré eliminating effect more than necessary. Here, the reason why the size of the dots is selected so as to meet the diameter of the fibers constituting the image of the exit end face of the image guide of the endoscope is because the intensity of moiré varies depending on the diameter of the fibers. FIG. 8 shows an actual structural example of the turret plate 20. The center of the turret plate 20 is rotatably secured to the television camera body 4. On the circumference of the turret plate 20 are formed notches 20a, 20b, 20c and 20d at positions corresponding to the optical low-pass filters 21, 22, 23 and 24, respectively. Arrangement is provided so that a foremost end portion 25a of a click spring 25 which is attached to the television camera body 4 is engageable with the notches 20a, 20b, 20c and 20d, respectively. It should be noted here that a portion of the circumference of the turret plate 20 protrudes to the outside of the television camera body. According to this structure, that portion of the turret plate 20 protruding to the outside of the television camera body 4 is operated manually to cause the engagement of the click spring 25 selectively with either one of the notches 20a, 20b, 20c and 20d so that a desired optical low-pass filter 21, 22, 23 or 24 can be selectively placed in the photographic optical path.

Figure 9A:
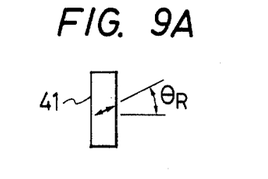
FIGS. 9A, 9B and 10A, 10B are diagrammatic illustrations showing other structural examples of optical low-pass filters.
Figure 9B:
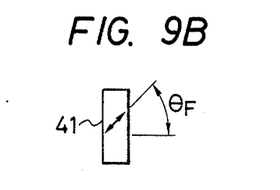
Figure 10A:
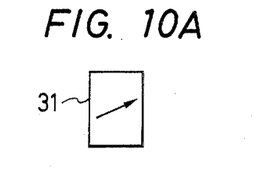
Figure 10B:
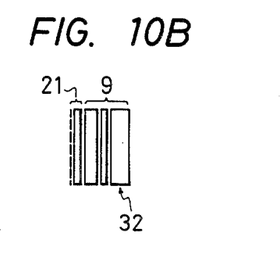

FIGS. 9A to 10B show other examples of optical low-pass filters which can be used in the above-described embodiment. That is to say, FIGS. 9A and 9B represent an example which is intended to use selectively two crystal or birefringent plates 41, 41 having a same thickness but having crystal axis orientations $\theta_R$ and $\theta_F$ about the optical axis, respectively, to vary the intensity of double refraction. As the $\theta_R$ and $\theta_F$ depart more from 45°, the amount of double refraction decreases accordingly, causing progressive reduction of moiré elimination effect. FIGS. 10A and 10B represent another example which is intended to use selectively a filter 31 which is formed by a single crystal or birefringent plate, and a filter 32 which consists of a first optical low-pass filter as designated by 9 in FIG. 1 and a second optical low-pass filter as designated by 21 in FIG. 7 disposed in front of the first low-pass filter. As the moiré elimination effect is large when the filter 32 consisting of a phase type optical low-pass filter and crystal or birefringent plates as shown in FIG. 10B is inserted in the photogaphing light path, if the filter 31 shown in FIG. 10A and the filter 32 shown in FIG. 10B are selectively used, the moiré elimination effect will be able to be varied to a great extent.

Figure 11:
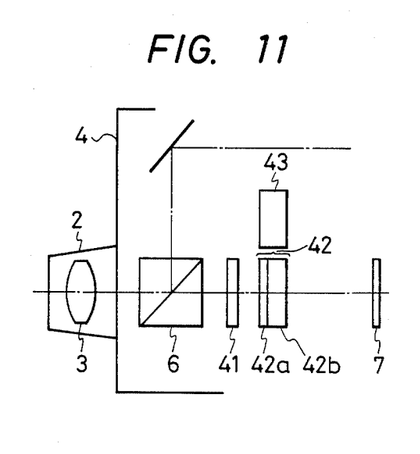
FIG. 11 is a diagrammatic illustration showing a third embodiment of the television camera according to the present invention.
Figure 12A:
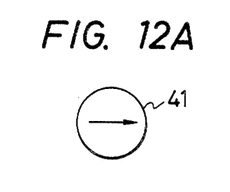
FIGS. 12A and 12B are diagrammatic illustrations showing the directions of double refraction of the crystal plates of FIG. 11.
Figure 12B:
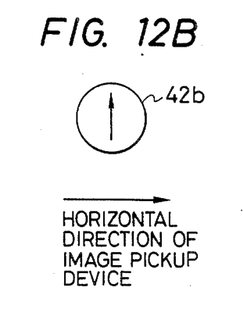

FIG. 11 shows an embodiment which is of the construction such that, between a beam splitter 6 and an image pickup device 7, there are disposed a fixed crystal or birefringent plate 41, a movable filter 42 which can be selectively placed in the photographic optical path, and a glass plate (transparent plate) 43. The filter 42 is comprised of a ¼ wave plate 42a and a crystal or birefringent plate 42b. The ¼ wave plate 42a is disposed in such an orientation that the beam of light emitting from the crystal plate 42b is rendered to a substantially circularly polarized light beam. The directions of separation of the light bundle due to double refraction of the crystal plates 41 and 42b are as shown in FIGS. 12A and 12B. According to this arrangement, while the filter 42 is being placed in the photographic optical path, the crystal plate 41 overlaps the filter 42, so that this embodiment functions in the same way as does the filter 9 of the first embodiment, whereas when the glass plate 43 is inserted in the photographic optical path, only the crystal plate 41 functions as the optical low-pass filter. Here, the glass plate 43 is arranged so that its refractive index and thickness are selected to insure that its equivalent air optical path is equal to that of the filter 42.

Figure 13:
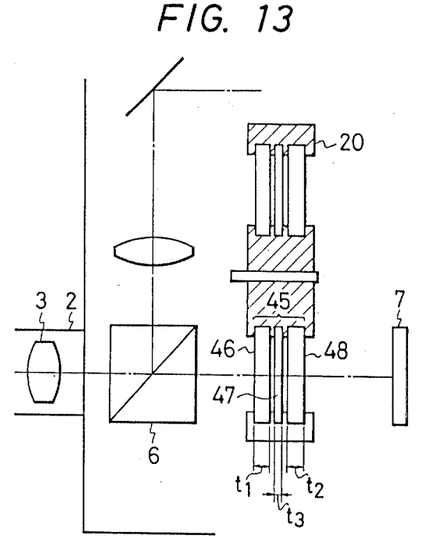
FIG. 13 is a diagrammatic sectional view of an essential portion showing a fourth embodiment of the television camera according to the present invention.
Figure 14:
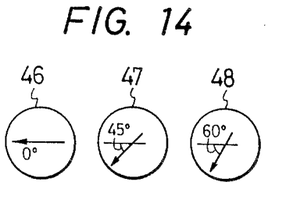
FIG. 14 is a diagrammatic illustration showing the orientations of the crystal axes of the crystal plates constituting the filter used in the embodiment of FIG. 13.

FIG. 13 shows a filter 45 of crystal or birefringent plates which can be provided on a turrent plate 20 in place of the phase type optical low-pass filters 21 to 24 which are provided on the turret plate 20 in the second embodiment. This filter 45 consists of three crystal or birefringent plates 46, 47 and 48 which are superimposed one upon another in the direction of the optical axis. The respective crystal plates are arranged in such a way that those crystal axes of the second and third crystal plates 47 and 48 lying within the planes crossing the optical axis at right angle assume substantially 45° and 60°, respectively, relative to the crystal axis of the first crystal plate 46, and that thus the light beam separation pattern rendered by the filter 45 acquires a substantial resemblance with the dispositional pattern of the fibers locating at the end face of the image guide.

Figure 15:
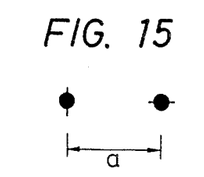
FIGS. 15 to 17 are diagrammatic illustrations, respectively, showing the action of separating the light by the crystal plates.
Figure 16:
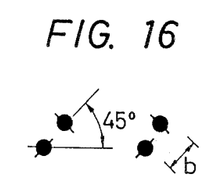
Figure 17:
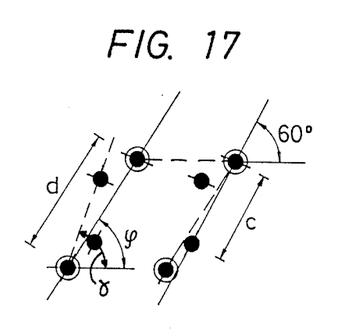

According to the filter 45 thus constructed, the incident light is divided first into two beams of light having an equal intensity by the first crystal plate 46 within a plane normal to the optical axis (FIG. 15), and then they are divided into four light beams of an equal intensity by the second crystal plate 47 (FIG. 16), and further they are divided into eight beams of light of non-equal intensities by the third crystal plate 48. In FIGS. 15 to 17, the short line passing through each black dot indicates the direction of polarization of the light beam. Also, letters a, b and c each represents the amount of separation of light beam done by the first to third crystal plates 46, 47 and 48, respectively. Also, the intensity of the light beam indicated by the double circles of FIG. 17 is to be understood as being by far the greater than the intensity of the light beam indicated by the black dot, with the ratio being about 14:1. Also, the letter d indicates the distance between the light beams marked by double circles. That is, the light beam separation pattern is formed at the sites of the double circles. The second crystal plate 48 is provided in order to take the balancing of the amounts of light of the two polarized light components (represented by double circles). The displacement of light beam by an amount "b" as shown in FIG. 16 is not important. Accordingly, the thickness of the second crystal plate 47 can be selected within a range of not being too thick, but it should be noted that this second crystal plate 47 desirably has a relatively small thickness. The reason why the crystal axis of the third crystal plate 48 assumes 60° relative to the crystal axis of the first crystal plate 46 is because of the following considerations. That is, because the segments of lines connecting the centers of those adjacently located fibers of the image 49 of the image guide at its end face assume about 60° relative to each other as shown in FIG. 18, it is intended to make the light beam separation pattern have a substantial resemblance with the dispositional pattern of the fibers located at the end face of the image guide.

Figure 18:
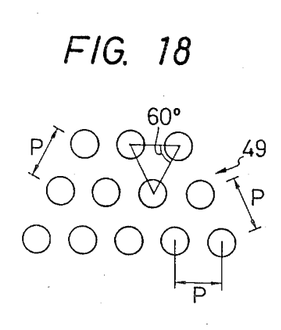
FIG. 18 is a diagrammatic illustration showing the image of the end face of the image guide.
Figure 19:
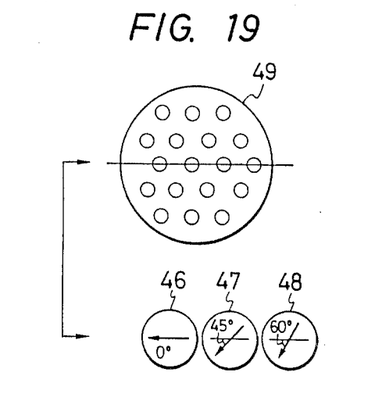
FIG. 19 is a diagrammatic illustration showing the relationship between the orientations of the crystal axes of the first crystal plate and the image of the end face of the image guide.
Figure 20:
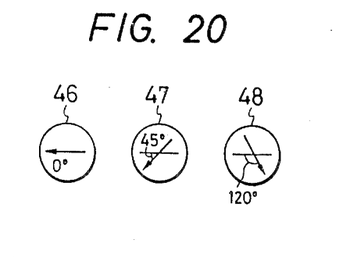
FIG. 20 is a diagrammatic illustration showing the orientations of other crystal axes which the first to the third crystal plates area able to possess.
Figure 21:
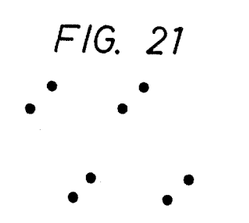
FIG. 21 is a diagrammatic illustration showing the state of separated light in FIG. 20.
Figure 22:
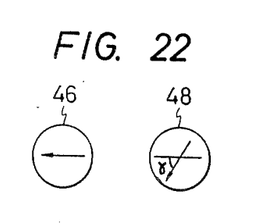
FIG. 22 is a diagrammatic illustration showing the angle $\theta$ of the crystal axis of the third crystal plate.

Accordingly, if the inter-central distance of respective adjacent fibers of the image 49 of the image guide is assumed here to be P as shown in FIG. 18, the respective thicknesses of the first to third crystal plates are selected by utilizing known formula to acquire the following relationships:

$$\left. \begin{array}{l} a = \tfrac{1}{2}P \\ b < P \\ c = \tfrac{1}{2}P \end{array} \right\} \quad (1)$$

or $$\left. \begin{array}{l} a = \tfrac{1}{2}P \\ d \approx b + c \\ \phantom{d} = \tfrac{1}{2}P \end{array} \right\} \quad (2)$$

and such crystal plates are disposed between the image pickup device 7 and the adapter 2 as shown in FIG. 13. Whereby, those frequency components causing moiré phenomenon with the image pickup device 7 are removed out of the incident light, so that there is obtained a picture which is free of moiré. It should be noted here, however, that the orientation of the crystal axis of the first crystal plate 46 is assumed to be parallel with the rectilinear lines connecting the centers of the fibers located at the image 49 of the image guide as shown in FIG. 19. In this way, there is performed the elimination of moiré. Since, however, the low-pass filter according to the present invention is constructed by crystal plates, there is a very little loss of low-frequency components, and there hardly arises a degradation of the image quality. Also, the orientations of the crystal axes of the first to third crystal plates 46, 47 and 48 may be as shown in FIG. 20. The light beam separation in this instance will become as shown in FIG. 21. Also, the material of the first to third crystal plates 46, 47 and 48 allows the use of any other substances in place of crystal provided that these other materials possess double refractivity. Next, the above-mentioned Formula (2) is considered by generalizing same. To begin with, if the angle of the crystal axis of the third crystal plate 48 located within the plane crossing the optical axis at right angle relative to the crystal axis of the first crystal plate 46 is designated as γ, the distance d in this instance and the Ψ shown in FIG. 17 (which is the smaller angle of the interior angles of a parallelogram formed by combining the separation of light beams which have relatively higher intensity among eight separation light beams emitted from the third birefringent plate are expressed by the following formula (3):

$$\left. \begin{array}{l} d = \sqrt{(b\cos 45° + c\cos\gamma)^2 + (b\sin 45° + c\sin\gamma)^2} \\ \psi = \tan^{-1}\left( \dfrac{b\sin 45° + c\sin\gamma}{b\cos 45° + c\cos\gamma} \right) \end{array} \right\} \quad (3)$$

Figure 23:
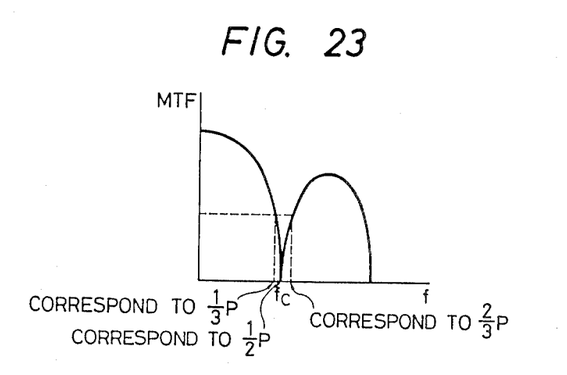
FIG. 23 is a chart of MTF curve of the double refraction filter.

Therefore, if b, c and γ are selected so as to obtain d=P/2, Ψ=±60° or ±120°, the optical low-pass filter which satisfies the above will display a better performance than the optical low-pass filter which satisfies the above formula (2). Practically, it is enough to select a, b and c so as to satisfy the following conditions:

$$\left. \begin{array}{l} \tfrac{1}{3}P < d < \tfrac{2}{3}P \\ \tfrac{1}{3}P < a < \tfrac{2}{3}P \\ 50° < |\psi| < 70° \text{ or } 110° < |\psi| < 130° \end{array} \right\} \quad (4)$$

for the d and Ψ which are defined by formula (3). The extent of the above formula (4) is determined substantially in the following manner. The MTF curve of the double refraction filter takes substantially such a configuration as shown in FIG. 23, and it can be expressed substantially by MTF= cos ½πfP. In this case, the cut-off frequency $f_c=1/P$, so that if the above embodiment is referred to, the relationship of "a" to "d" is exactly a=d=P/2. $\tfrac{1}{3}P \sim \tfrac{2}{3}P$ represents a range that MTF becomes about ½ centering around the cut-off frequency $f_c$. When MTF becomes so small up to this order, moiré will disappear on the whole. Also, the condition of |Ψ| is being selected within the extent in which the value of MTF can eliminate moiré to a practically unharmful extent.

Figure 24:
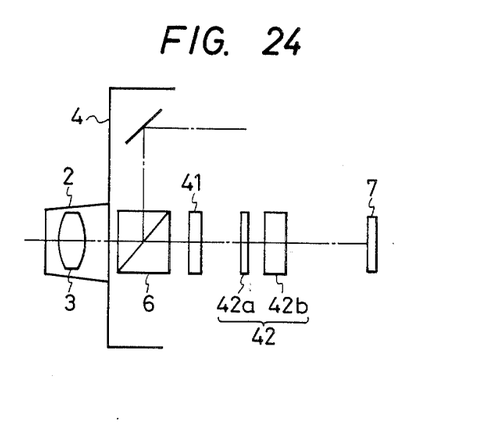
FIGS. 24 and 25 are diagrammatic representations showing modified examples of the embodiment shown in FIG. 11.

FIG. 24 shows the arrangement that, in the embodiment of FIG. 11, the glass 43 is excluded and that, out of the filter 42, the ¼ wave plate 42a is provided so as to be able to rotate around the optical axis, and that the crystal plate 42b is fixed, and that, by adjusting the rotation of this ¼ wave plate 42a, the moiré elimination effect can be varied. It should be noted here that moiré elimination effect can be varied also by the arrangement that the ¼ wave plate 42a is fixed while the crystal plate 42b is rendered rotatable.

Figure 25:
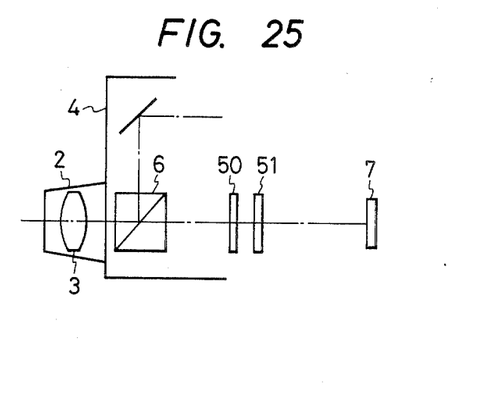

FIG. 25 shows an embodiment wherein phase type optical low-pass filters 50 and 51 are disposed between a beam splitter 6 and an image pickup device 7. At least either one of the low-pass filters 50 and 51 is rotatable about the optical axis, and by adjusting the rotation thereof, the moiré elimination effect can be varied. In this case, by arranging the low-pass filters 50 and 51 to be positioned close to each other and by arranging the location of the dots of these two filters so as to be identical in each filter, and by making the total area of the dots portions of these respective filters to be either 25% or 75% of the surface area of these filters, a moiré elimination effect similar to that by the filter 21 of FIG. 7 can be obtained when the two low-pass filters 50 and 51 are locally overlapped in a displaced fashion. Also, when the two low-pass filters 50 and 51 are overlapped without any displacement relative to each other, moiré elimination effect will almost disappear, and thus, by the rotation of the two low-pass filters 50 and 51, a necessary moiré elimination effect can be achieved.

Description has been made above with respect to the television cameras having an optical finder in the above-mentioned embodiments. However, the present invention is not limited to such a television camera, but needless to say the present invention can be applied also to television cameras for endoscope having no optical finder. Further, the present invention can be equally effectively applied also to ordinary television cameras and to electronic still cameras.

What is claimed is:

1. An optical low-pass filter comprising a first birefringent plate, a second birefringent plate and a third birefringent plate which are disposed along an optical axis, said optical low-pass filter being satisfied with the following condition:

$$50° < |\Psi| < 70° \text{ or } 110° < |\Psi| < 130°$$

where $\Psi$ is an angle made by the direction of the light beam separation of said first birefrigent plate with the direction of the light beam separation of said third birefringent plate, being constructed so that said second birefringent plate is thinner than said first and third birefringent plate and differs in direction of the light beam separation from any of said first and third birefringent plate, and being arranged so that a distance d between light beams with higher intensity among the light beams with non-equal intensity caused by said third birefringent plate is determined from the following formula:

$$d = \sqrt{(b \cos 45° + c \cos \gamma)^2 + (b \cos 45° + c \sin \gamma)^2}$$

and the following conditions are satisfied:

$$\tfrac{1}{3}P < d < \tfrac{2}{3}P, \tfrac{1}{3}P < a < \tfrac{2}{3}P$$

where a, b and c are the amount of the light beam separation of said first, second and third birefringent plates, respectively, and P is a distance between the centers of fibers adjacent to each other among the fibers constituting said image guide fiber bundle and $\gamma$ is the angle of axis orientation of said third plate.

2. An optical low-pass filter comprising a first birefringent plate, a second birefringent plate and a ¼ wave plate interposed between said first and second birefringent plates, which are disposed along an optical axis, said ¼ wave plate being arranged to be rotatable about said optical axis and said first and second birefringent plates being arranged to be non-rotatable about said optical axis.

3. A television camera for endoscopes comprising an optical low-pass filter, said optical low-pass filter comprising a first birefringent plate, a second birefringent plate and a ¼ wave plate interposed between said first and second birefringent plates which are disposed along an optical axis, said ¼ wave plate being arranged to be rotatable about said optical axis and said first and second birefringent plates being arranged to be non-rotatable about said optical axis.

4. A television camera for endoscopes comprising two phase type optical low-pass filters constructed so that the area of phase portions of these respective filters are approximately 25% or 75% of the total area within effective diameters of these filters and the patterns of said phase portions are substantially identical with each other, at least either one of said filters being arranged to be rotatable about an optical axis.

5. A television camera for endoscopes according to claim 4, said patterns of said phase portions being substantially overlapped when said camera is attached to a non-flexible endoscope, while said patterns of said phase portions being substantially not overlapped when said camera is attached to a fiberscope.

6. A television camera for endoscopes comprising a first optical low-pass filter fixed in an optical path of an image pickup device, a second optical low-pass filter provided detachably in the optical path, and a transparent parallel plate having an equivalent air optical path which is substantially the same as in said second optical low-pass filter, said parallel plate being inserted into the optical path when said second optical low-pass filter is removed from the optical path.

7. A television camera for endoscopes according to claim 6, in which said camera is attached to a non-flexible endoscope for use, said transparent parallel plate is inserted into said optical path, while, when said camera is attached to a fiberscope for use, said second optical low-pass filter is inserted into said optical path.

8. A television camera for endoscopes, comprising:
a camera body;
a photographic lens detachably mounted on said camera body an image pickup device provided in the interior portion of said camera body for receiving light having passed through said photographic lens; and
a filter supporting member supporting a plurality of optical low-pass filters having mutually different spatial frequency responses and arranged so that either one of said plurality of optical low-pass filters is inserted into or removed from an optical path between said photographic lens and said image pickup device within said camera body,
said plurality of optical low-pass filters being selectively switchable to thereby cause moire eliminating effect of said television camera to be varied, in which, when said camera body is attached to a non-flexible endoscope for use, an optical low-pass filter with weak moire elimination effect is inserted into said optical path, while, when said camera body is attached to a fiberscope for use, an optical low-pass filter with strong moire elimination effect is inserted into said optical path.

9. A television camera according to claim 8, further comprising:
a beam splitter provided within said camera body on the optical path between said photographic lens and said filter supporting member; and
a finder optical system provided within said camera body in association with said beam splitter for leading the light separated by said beam splitter.

10. A television camera according to claim 8, in which:
said filter supporting member is slidable in a direction crossing said optical path at right angle and is arranged as a slidable frame to hold a first optical low-pass filter and a second optical low-pass filter.

11. A television camera according to claim 10, in which:
said first optical low-pass filter is comprised of a ¼ wave plate and a pair of birefringent plates which, while providing said ¼ wave plate therebetween, perform separation of a light bundle by double refraction in directions mutually crossing each other at right angle, and which are such that the orientations of the crystal axes of the respective birefringent plates assume 45° relative to the optical axis; and in which:
said second optical low-pass filter is comprised of a single optical low-pass filter plate having a thickness smaller than that of the first optical low-pass filter and a single transparent plate cemented to said first optical low-pass filter to equalize the optical path therewith.

12. A television camera according to claim 10, in which:
said first and second optical low-pass filters are constructed by birefringent plates having a same thickness and having mutually different angles of their crystal axes relative to an optical axis.

13. A television camera according to claim 10, in which:
said first optical low-pass filter is comprised of a ¼ wave plate, a pair of birefringent plates for performing separation, due to double refraction, of a light bundle in directions mutually crossing each other at right angle while providing said ¼ wave plate therebetween, with the orientations of birefringent axes of the respective crystal plates forming 45° relative to the optical axis, and also comprised of a phase type optical low-pass filter disposed in front of said birefringent plates located on said photographic lens side, and
said second optical low-pass filter is comprised of a single crystal plate with the same optical path length as that of said first optical low-pass filter.

14. A television camera according to claim 8, in which:
said filter supporting member is constructed as a turret plate provided with four phase type optical low-pass filters rotatable within a plane normal to said optical path and having mutually different spatial frequency responses.

15. A television camera according to claim 14, in which:
said optical low-pass filters are each constructed by depositing, in the form of dots, pieces of vapor-deposition film onto a transparent plate.

16. A television camera for endoscopes, comprising:
a camera body
a photographic lens detachably mounted on said camera body
an image pickup device provided within said camera body for receiving light having passed through said photographic lens;
a slidable frame mounted within said camera body between said photographic lens and said image pickup device for being slidable in a direction normal to an optical axis and holding a filter and a transparent plate so as to be able to place either one of said filter and said transparent plate onto said optical axis alternatively; and
a first birefringent plate fixedly arranged on said optical axis in said camera body,
said filter comprising a second birefringent plate and a ¼ wave plate disposed in front of said second birefringent plate and having a crystal axis whose orientation is selected so as to insure that the light emitting from said second birefringent plate substantially becomes a circular polarized light,
said first birefringent plate having a light ray separating direction parallel to a horizontally scanning direction of said image pickup device,
said second birefringent plate having a light ray separating direction normal to a horizontally scanning direction of said image pickup device,
either one of said filter and said transparent plate being provided onto said optical path to thereby cause moire eliminating effect of the camera to be varied, in which, when said camera body is attached to a non-flexible endoscope for use, said transparent plate is inserted into said optical path, while when said camera body is attached to a fiberscope for use, said filter is inserted into said optical path.

17. A television camera according to claim 16, further comprising:
a beam splitter disposed within said camera body on the optical path between said photographic lens and said first birefringent plate; and
a finder optical system disposed within said camera body in association with said beam splitter for leading the light having been split by said beam splitter.

18. A television camera for endoscopes, comprising:
a camera body
a photographic lens detachably mounted on said camera body;
an image pickup device provided within said camera body for receiving light having passed through said photographic lens; and
a turrent plate mounted within said camera body between said photographic lens and said image pickup device for rotation within a plane normal to an optical axis and provided with a plurality of optical low-pass filters having mutually different spatial frequency responses, respectively and capable of placing either one of said plurality of optical low-pass filters onto the optical path of the light having passed through said photographic lens,
each of said plurality of optical low-pass filters being comprised of a first, a second and a third birefringent plate superimposed one upon another in the direction of the optical axis,
said first, second and third birefringent plates being disposed in such a way that the crystal axes of said second and third birefringent plates located within the planes thereof normal to the optical axis forming substantially 45° and 60° or 120°, respectively, relative to the crystal axis of said first birefringent plate,
said plurality of optical low-pass filter provided onto said optical path being switched to thereby cause moire eliminating effect of a camera to be varied, in which, when said camera body is attached to a non-flexible endoscope for use, an optical low-pass filter with weak moire elimination effect is inserted into said optical path, while, when said camera body is attached to a fiberscope for use, an optical low-pass filter with strong moire elimination effect is inserted into said optical path.

19. A television camera according to claim 18, further comprising:
a beam splitter disposed wiithin said camera body on the optical path between said photographic lens and said turrent plate; and
a finder optical system disposed within said camera body in association with said beam splitter for leading the light having been split by said beam splitter.

20. A television camera for endoscopes, comprising:
a camera body
a photographic lens detachably mounted on said camera body;
an image pickup device provided within said camera body for receiving light having passed through said photographic lens;
a first birefrigent plaate fixedly disposed within said camera body on the optical path between said photographic lens and said image pickup device;
a ¼ wave plate disposed for rotation by manual operation within said camera body on the optical path between said first birefringent plate and said image pickup device; and a second birefringent plate disposed fixedly within said camera body on the optical path between said ¼ wave plate and said image pickup device, arrangement being provided so that, by rotating said ¼ wave plate about the optical axis, moire eliminating effect can be varied, in which, when said camera body is attached to a non-flexible endoscope, said moire elimination effect is reduced, while, when said camera body is attached to a fiberscope, said moire elimination effect is increased.

21. A television camera according to claim 20, further comprising:

a beam splitter disposed within said camera body on the optical path between said photographic lens and said first birefringent plate; and a finder optical system disposed within said camera body in association with said beam splitter for leading the light having been split by said beam splitter.

22. A television camera for endoscopes comprising an optical low-pass filter, said optical low-pass filter comprising at least two birefringent plates arranged to be non-rotatable about an optical axis and at least one ¼ wave plate interposed between said birefringent plates to be rotatable about said optical axis, a crystal axis orientation of said ¼ wave plate being selected so that when said camera is attached to a non-flexible endoscope, low-pass filter effect is reduced, while, when said camera is attached to a fiberscope, the low-pass filter effect is increased.

23. A television camera for endoscopes performing an image pickup of an object image transmitted to an exit end face of an image guide fiber bundle of a fiberscope, said television camera comprising an optical low-pass filter provided with a first birefringent plate, a second birefringent plate and a third birefringent plate which are disposed along an optical axis, said optical low-pass filter satisfying one of the following conditions:

$$50° < |\Psi| < 70° \text{ or } 110° < |\Psi| < 130°$$

where $\Psi$ is an angle made by the direction of the light beam separation of said first birefringent plate with the direction of the light beam separation of said third birefringent plate, and being constructed so that said second birefringent plate is thinner than said first and third birefringent plates and differs in direction of the light beam separation from any of said first and third birefringent plates.

24. A television camera for endoscopes according to claim 23, in which a distance d between light beams with higher intensity among the light beams with non-equal intensity caused by said third birefringent plate is determined from the following formula:

$$d = \sqrt{(b \cos 45° + c \cos \gamma)^2 + (b \sin 45° + c \sin \gamma)^2}$$

and the following conditions are satisfied:

$$\tfrac{1}{3}P < d < \tfrac{2}{3}P, \tfrac{1}{3}P < a < \tfrac{2}{3}P$$

where a, b and c are the amount of the light beam separation of said first, second and third birefringent plates, respectively, and P is a distance between the centers of fibers adjacent to each other among the fibers constituting said image guide fiber bundle and $\gamma$ is the angle of axis orientation of said third plate.

25. A television camera for endoscopes according to claim 23, in which the direction of the image separation of said first and third birefringent plates substantially coincides with the direction of a fiber array at the exit end face of the image guide fiber bundle.

26. A television camera for endoscopes according to one of claims 23 to 25, in which said television camera is detachably mounted on the fiberscope.

* * * * *